UNITED STATES PATENT OFFICE.

ARTHUR T. WOODWARD, OF NEW YORK, N. Y.

PLASTIC COMPOUND.

SPECIFICATION forming part of Letters Patent No. 407,271, dated July 16, 1889.

Application filed April 29, 1889. Serial No. 308,968. (No specimens.)

*To all whom it may concern:*

Be it known that I, ARTHUR T. WOODWARD, a citizen of the United States of America, and a resident of New York, in the county and State of New York, have invented certain new and useful Improvements in Plastic Compounds, of which the following is a full, clear, and exact description.

This invention relates to a plastic compound impervious to water and suitable for various uses in the arts—such as an insulator for underground, submarine, overhead, telegraph, telephone, power and light, and all other electric conductors; beds for electro-dynamos, coating metal surfaces, pneumatic tubes, wood for railroad-ties, and other purposes; also for ships' bottoms, piles, &c., exposed to the action of salt water, and in fact for other and various articles used in the arts, and which are exposed to the action of the atmosphere or of moisture and of both.

The improved compound of this invention is made of silica—such as flint, glass, sand, &c.—mineral or vegetable resin or pitch—such as colophony or asphaltum, sulphur, arsenic, and manganese, either with or without animal, vegetable, or mineral wax and oil.

The silica and resin or pitch are both separately pulverized to impalpable powder, intimately mixed, and having added the sulphur, arsenic, and manganese, the whole is subjected to heat sufficient to melt and reduce the several ingredients other than the silica to a condition suitable to cause them to form a coating about the particles of silica and to secure their adhesion and union on the cooling of the mixture, the whole forming a mass of exceeding adhesiveness, dryness, hardness, great strength and density, imperviousness to moisture, and most remarkable in its properties as an insulator for electric purposes, and a resistant to the action of saline solutions and to the attacks of animalcula of all kinds.

To render the compound most susceptible and capable of use for the purposes stated, it is preferable to reduce it to a greater condition of fluency than that obtained by its preparation just explained, and to that end, wax and oil, animal, vegetable, or mineral, are used, using also advantageously a slight admixture of turpentine or benzine.

The compound of this invention may be molded in any of the ordinary forms of molds used for molding heated plastic materials or metals, and may also be molded in wooden or sand molds, as may be specially requisite.

The proportions of materials preferable to employ are approximately as follows: Fifty pounds silica, ten pounds sulphur, two pounds arsenic, five pounds manganese, twenty-five pounds resin or gum, and, as before explained, three pounds of wax and five pounds of oil.

An ordinary caldron—such as is used in boiling pitch and paving and roofing compounds—may be employed for reducing the compound described to a fluid state.

It is best to pulverize the silica and resin separately, as they can thus be most thoroughly reduced to impalpable powder, which it would be difficult to accomplish were they pulverized together, and for other obvious reasons.

The sulphur imparts adhesiveness to the compound, the arsenic tends to render the compound proof against the attacks of animalcula, and manganese facilitates the hardening and drying of the compound.

Having thus described my invention, what I claim, and desire to secure by Letters Patent, is—

The plastic compound herein described, composed of pulverized silica—such as flint, glass, or sand—and a mineral or vegetable resin or pitch mixed therewith, combined with sulphur, arsenic, and manganese, substantially as described, for the purpose specified.

In testimony whereof I have hereunto set my hand in the presence of two subscribing witnesses.

ARTHUR T. WOODWARD.

Witnesses:
ALBERT W. BROWN,
HENRY F. MCKEEVER.